United States Patent
Maximus et al.

(10) Patent No.: US 7,495,830 B2
(45) Date of Patent: Feb. 24, 2009

(54) POLARISATION RECUPERATION SYSTEM

(75) Inventors: Bart Maximus, Oudenaarde (BE); Rik Defever, Kuurne (BE)

(73) Assignee: Barco, N.V., Kortrijk (BE)

( * ) Notice: Subject to any disclaimer, the term of this patent is extended or adjusted under 35 U.S.C. 154(b) by 234 days.

(21) Appl. No.: 11/289,280

(22) Filed: Nov. 30, 2005

(65) Prior Publication Data

US 2006/0132772 A1     Jun. 22, 2006

Related U.S. Application Data

(60) Provisional application No. 60/631,430, filed on Nov. 30, 2004.

(51) Int. Cl.
G02B 27/28    (2006.01)
G02B 5/30     (2006.01)
G03B 21/14    (2006.01)
F21V 9/14     (2006.01)

(52) U.S. Cl. .............. 359/495; 362/19; 353/20; 359/497

(58) Field of Classification Search ........ 359/495
See application file for complete search history.

(56) References Cited

U.S. PATENT DOCUMENTS 5,381,250 A    1/1995    Meadows 6,049,404 A  *  4/2000   Wu et al. .......... 385/16

FOREIGN PATENT DOCUMENTS

JP    2003-295315    10/2003

OTHER PUBLICATIONS

Patent Abstracts of Japan, vol. 018, No. 306 (P-1752), Jun. 10, 1994 & JP 06 067220 A (Nippon Telegr & Teleph Corp <NTT>), Mar. 11, 1994 *abstract*.

* cited by examiner

Primary Examiner—Stephone B. Allen
Assistant Examiner—Jade Callaway
(74) Attorney, Agent, or Firm—Bacon & Thomas, PLLC

(57) ABSTRACT

A polariser or a system for lighting using such a polariser in a polarisation recuperation system. The polariser comprises first and second polarising beam splitters (212a, 212b) for splitting first and second unpolarised beams each into at least first and second polarised beams of different polarisation states. The first and second polarised beams are guided to first and second light paths respectively. On these light paths controllable polarisation conversion elements (218a, 218b) are arranged such that the second polarised beam from the first unpolarised beam time-shares a same path through the polarisation conversion element (218a, 218b) as the first polarised beam from the second unpolarised beam. The controllable polarisation conversion elements are switchable to alternately convert and not convert the polarisation state, depending on which beam is switched to pass through the polarisation conversion elements (218a, 218b), corresponding with which of the first or second unpolarised beams are present.

13 Claims, 3 Drawing Sheets

POLARISATION RECUPERATION SYSTEM

TECHNICAL FIELD OF THE INVENTION

The present invention relates to the field of polarisers and illumination systems. More particularly, the present invention relates to a polariser and an illumination system, e.g. for use in a projection system, having a polarisation recuperation system and methods for illuminating with polarised light.

BACKGROUND OF THE INVENTION

A liquid crystal device (LCD) or liquid crystal on semiconductor (LCOS) device may be used in various applications, such as for example displays like in laptop computers, watches and calculators, and such as for example projection systems for projecting information or images onto a distant screen. An LCD or LCOS projector basically comprises a light generator such as a lamp for generating illumination light, illumination optics for capturing that light and transferring it to one or a plurality of LCD or LCOS devices comprising light valves, and a projection lens which images the illuminated LCD or LCOS device(s) on a screen. A basic property of both LCD and LCOS devices is that they work with polarised light, more particularly with linearly polarised light. Polarised light is used together with the properties of the liquid crystal elements to selectively on the one hand transmit and on the other hand reflect or absorb light to produce a modulated light beam, i.e. to produce a pattern of bright and dark pixels, thus creating a desired image. Because almost all illumination sources used in projectors generate non-polarised light, which is light comprising at least two polarisation directions, this light has to be polarised in an optical system either before it reaches the LCD or LCOS device(s) or in the device itself. This may be done by only selecting that part of the light which has a desired polarisation direction, e.g. using a polarising filter, which method, however, leads to a loss of light output for the projector.

To overcome this problem, typical LCD or LCOS projectors use a polarisation recuperation system that splits the unpolarised light from the lamp into two light beams which each have one of the two independent polarisation directions. Each light beam with a different polarisation direction follows a different optical path. The two independently polarised states for example can be two orthogonal linear polarisations or as another example a left and right circular polarisation. The light with one of the two polarisation directions is then converted into the other polarisation state by a retarder or a polarisation rotator. Thereafter, the light is cast on the LCD or LCOS devices via another optical path. This system avoids throwing away the light having the unwanted polarisation state and therefore almost doubles the efficiency of the illumination optics. A typical polarisation recuperation device comprises a polarising beam splitter or polarising beam splitter array and a number of polarisation conversion components, as shown for the device 100 in FIG. 1.

The light, generated by light sources 102, is directed to a polarisation recuperation device 104 using optical elements 106, 108. The light impinges on a number of entrance surfaces 110 of the polarising beam splitter array. In the array of polarising beam splitters 112 (PBS) this light is split-up into two different light paths. The two light paths are generally constructed in such a way that at the output surface 114, 116 of the PBS 112 they are put adjacent to each other. The output surface 114, 116 of the polarising beam splitters 112 consists out of first types of sub-surfaces 114 and second types of sub-surfaces 116, each emitting light with different polarisation state. One or more polarisation conversion components 118, i.e. for example a halfwave retarder, are then put on e.g. all second types of output sub-surfaces 116 emitting one of the two types of polarisation state. These polarisation conversion components 118 substantially change the polarisation state of the light coming out of these second type of output sub-surfaces 116 into the polarisation state of the light coming out of the first type of output sub-surfaces 114 that do not have a polarisation conversion component 118. Typically in such a polarisation recuperation device 104 the number of the output sub-surfaces 114, 116 is doubled with respect to the number of entrance surfaces 108. Corresponding therewith, typically the total surface area of the output sub-surfaces 114, 116 is doubled with respect to the total surface area of the input surfaces 108.

SUMMARY OF THE INVENTION

It is an object of the present invention to provide apparatus or methods for illuminating with improved illumination properties, and/or to provide apparatus for efficiently creating a polarised light beam.

It is an advantage of embodiments of the present invention that the light output of the illumination system can be high. It is also an advantage of embodiments of the present invention that more compact illumination systems can be obtained or that illumination systems with a larger luminous output can be obtained, compared to prior art devices.

The above objective is accomplished by a method and device according to the present invention.

An aspect of the invention provides a polariser comprising first and second polarising beam splitters for splitting first and second unpolarised beams each into at least first and second polarised beams of different polarization states, and a polarisation conversion element after each polarising beam splitter, arranged such that the second polarised beam from the first unpolarised beam time-shares a same path through the polarisation conversion element as the first polarised beam from the second unpolarised beam. The polarization conversion element is switchable to alternately convert the polarization state or not convert the polarisation state of the impinging polarised beam, depending on which beam is switched to pass through the conversion element. Which beam is switched to pass through the polarisation conversion element may be determined by which of the first unpolarised beams or the second unpolarised beams is received and split at that moment.

It is an advantage of embodiments of the present invention that it enables an arrangement wherein the number of exit surfaces of the polariser can be reduced, e.g. substantially halved, compared to prior art systems, or wherein substantially twice the number of beams can be used compared to prior art systems. Hence the light output can be increased. With substantially halved there is meant that, for entrance surfaces and exit surfaces of substantially the same size, the number of exit surfaces of the polariser may be equal to the number of entrance surfaces augmented with 1. The polarisation conversion element can be controlled to follow the switching of the beams, or vice versa, wherein the switching of the beams can be controlled to follow the switching of the polarisation conversion elements.

The polariser may have an array, such as e.g. a line, of polarising beam splitters and conversion elements, each conversion element being arranged to receive beams from two or more neighbouring ones of the polarising beam splitters.

Each polarising beam splitter may be arranged in the path of an array, such as e.g. a line, of unpolarised beams switched on simultaneously. The unpolarised beams may be simultaneously switched in pulsed regime. This can enable the polariser to handle a two-dimensional array of unpolarised beams.

Another aspect provides a system for lighting, e.g. an illumination system, the system for lighting comprising multiple light sources each generating an unpolarised beam, and a polariser as set out above.

Amongst the different applications of such a system for lighting, e.g. illumination system, are the use in projection systems and backlights for display applications.

The system for lighting, e.g. illumination system, or the display adapted for using such a system for lighting illumination system may comprise a light source controller, also referred to as light source modulator, for modulating the light sources so that beams sharing the same conversion element are switched on alternately. The sharing may be time-sharing. Other ways of switching the beams can be envisaged, such as using optical switches, but these may be less practical and lose some of the advantages.

The light sources may be light emitting devices (LEDs) or lasers. These are examples of sources which can have their peak light output increased if they are operated in a modulated mode.

Another aspect provides a method of controlling the above described system for lighting, e.g. illumination system or the display comprising such a system for lighting, e.g. illumination system, by modulating the light sources and the polarisation conversion elements synchronously. The invention therefore also relates to a controller for controlling the above illumination system or the display comprising such an illumination system by modulating the light sources and the polarisation conversion elements synchronously.

Another aspect provides a method for creating a polarised light beam, the method comprising
  receiving first and second unpolarised beams and splitting each of said first and second unpolarised beams into at least first polarised beams having a first polarisation state and second polarised beams having a second polarisation state differing from the first polarisation state,
  guiding said first polarised beams on first light paths and said second polarised beams on second light paths, the first light paths and second light paths comprising controllable polarisation conversion elements and the second polarised beams of the first unpolarised beams time-sharing light paths through said controllable polarisation conversion elements with said first polarised beams of the second unpolarised beams; and
  switching said controllable polarisation conversion elements to alternately convert the polarisation state or not convert the polarisation state of the impinging polarised beam depending on which of the first or second polarised beams are received.

Particular and preferred aspects of the invention are set out in the accompanying independent and dependent claims. Features from the dependent claims may be combined with features of the independent claims and with features of other dependent claims as appropriate and not merely as explicitly set out in the claims.

The teachings of the present invention permit the design of improved methods and apparatus for polarising light and/or illuminating with polarised light. The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
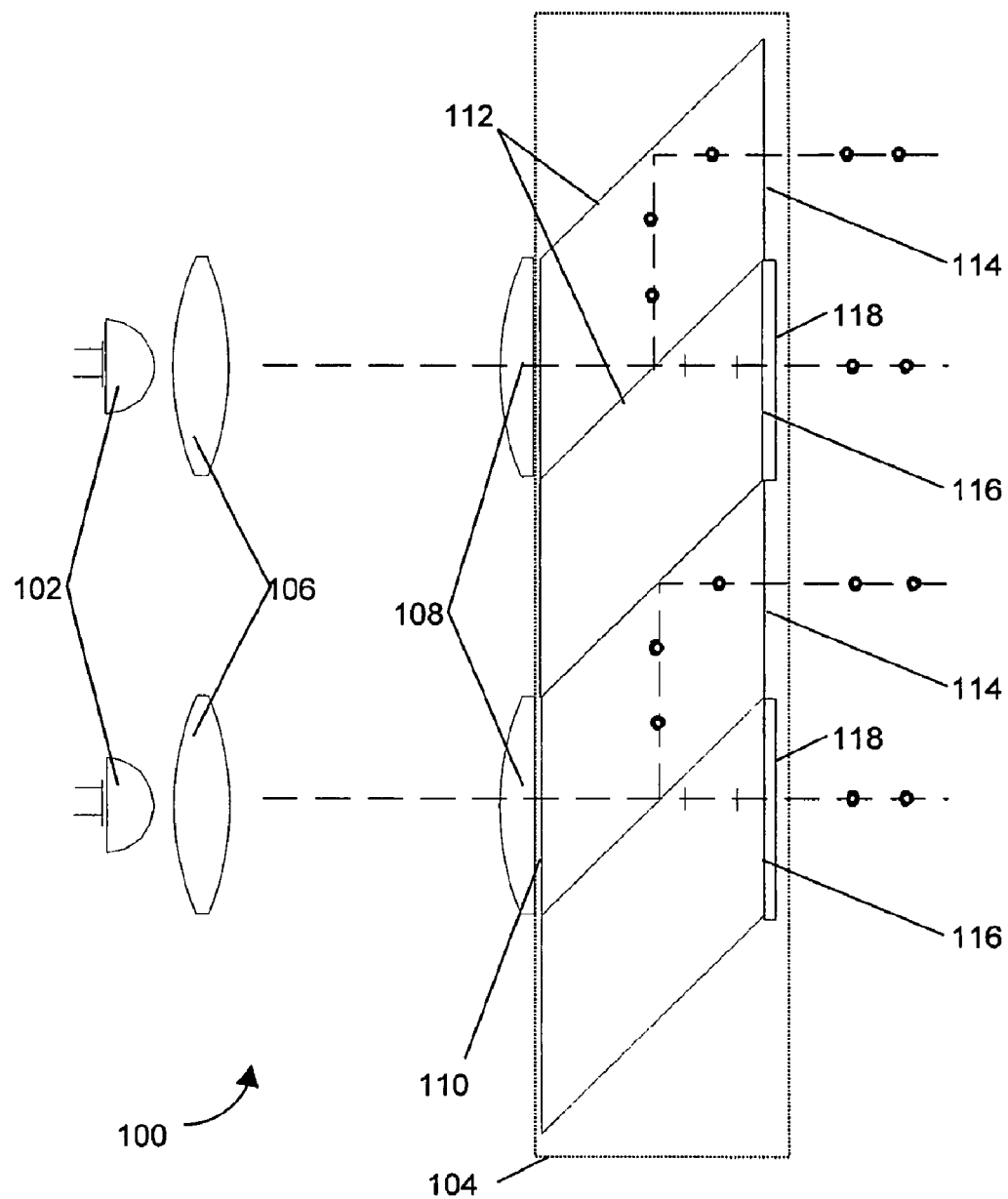
FIG. 1 shows a schematic representation of an example of a polarisation recuperation system according to prior art, used in combination with LED devices.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 2:
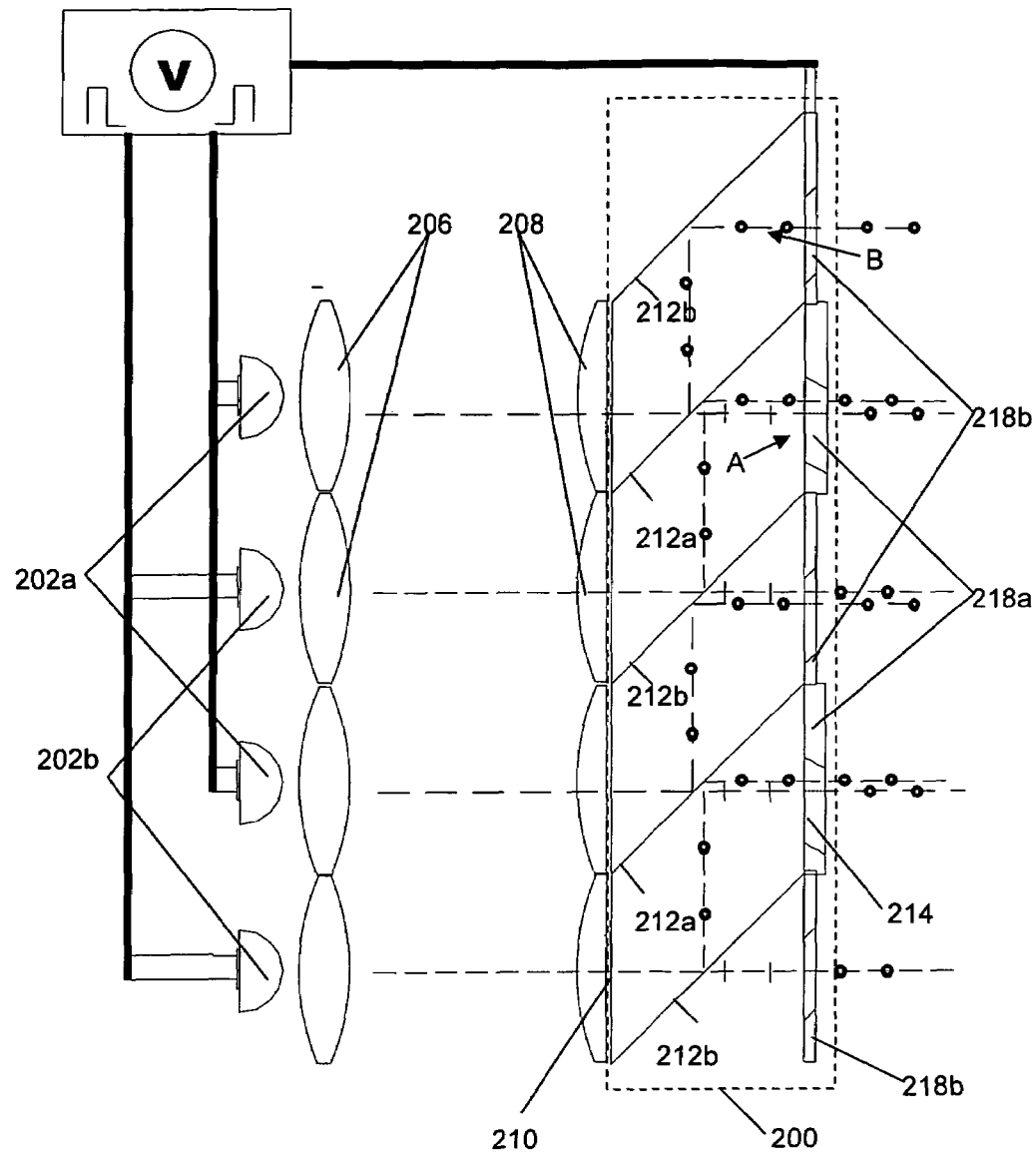
FIG. 2 shows an exemplary schematic representation of a polariser and a corresponding system for lighting according to aspects of the present invention.

In a first aspect, the present invention relates to a polariser for creating an illumination beam of light having a predetermined polarisation state. Illumination beams of light having a predetermined polarisation state typically can be used e.g. for illumination in a projection system or in a backlight based on liquid crystal devices (LCD) or liquid crystal on silicon (LCOS) devices, although the use is not limited thereto. The polariser of the present embodiment typically allows having a high luminous output. An example of such a polariser 200 is schematically shown by way of illustration in FIG. 2. The polariser 200 typically comprises a plurality of polarising beam splitters 212a, 212b, which may be arranged in an array. Such polarising beam splitters 212a, 212b may be made of any solid material such as solid glass, quartz, etc. or may be reflective polarisers, such as for example but not limited to wiregrid polarisers. Such polarising beam splitters 212a, 212b also may be polarisation selective layers included between solid material prisms. Depending on the type of polarisation beam splitter used, the surrounding of the polarisation selective element may be are, e.g. for wiregrid polarisers, or is a glass or quartz prism, e.g. for the solid material polarising beam splitters. In FIG. 2 the example of a wiregrid polariser is shown. The polarising beam splitters 212a, 212b typically are arranged such that they are adapted to be illuminated on an input surface 210 by a number of images from light sources 202a, 202b, such as for example light emitting diodes (LED), lasers, . . . Such light sources 202a, 202b typically may be light sources 202a, 202b that can be operated in a pulsed regime, also referred to as a pulsed mode, i.e. wherein the light emission is not continuous but occurs in light pulses. Advantageously, light sources 202a, 202b may have the property that, when driven in a pulsed mode, they can have a total light flux integrated over time which can be very similar, i.e. substantially similar, or only a fraction less than the total flux integrated over that same time period in continuous drive mode. The light gain then is realised by the fact that the peak current during the pulsing can be higher than the nominal current during continuous operation. An example of such light sources 202a, 202b are LEDs. In the embodiments of the present invention, all the polarising beam splitters 212a, 212b may be illuminated, each of them by one or more light sources 202a, 202b, such as e.g. LED devices. This is contrary to the prior art arrangement 104 shown in FIG. 1 where empty spaces or even complete empty strips in between the input surfaces have to be foreseen. The light sources 202a, 202b may be, but typically are not, part of the polariser 200 according to the first embodiment of the present invention.

In the first embodiment of the present invention, the polarising beam splitters 212a, 212b each split incoming light into a first light path A and a second light path B. Which light path a specific part of the light will follow depends on the polarisation state of the light. Typically the polarising beam splitters 212a, 212b are adapted for guiding light having a first polarisation state along a first light path A and for guiding light having a second polarisation state along a second light path B. The polarisation states of the light selectively guided by the polarising beam splitter 212a, 212b typically may be two independent polarisation states such as for example but not limited to two orthogonal linear polarisations or a left and right circular polarisation. The polarising beam splitters 212a, 212b of the present embodiment are arranged in such a way that the second light path B from a first polarising beam splitter 212a, 212b in the array will be recombined with the first light path A of a neighbouring polarising beam splitter 212b, 212a in the array, so that they will substantially exit the array of polarising beam splitters at the same area of the exit surface 214.

In the present embodiment, at the exit surface 214 of the polarising beam splitters 212a, 212b, controllable polarisation conversion elements 218a, 218b are positioned. The controllable polarisation conversion elements 218a, 218b, which may be electrically controlled polarisation conversion strips, are divided into two sub-sets, which are driven to have a different control regarding the polarisation conversion. This control, e.g. electrical control, will put the polarisation conversion elements 218a, 218b either OFF or ON. Such a controllable polarisation conversion element 218a, 218b may be for example a switchable retarder, although other types of controllable polarisation conversion elements 218a, 218b can also be used. A switchable retarder can for example be realised by a liquid crystal device, i.e. a ferro-electric liquid crystal cell. In the present embodiment, the controllable polarisation conversion elements 218a, 218b are driven in such a way that neighbouring controllable polarisation conversion elements 218a, 218b corresponding with neighbouring polarising beam splitters 212a, 212b have an inverted function, meaning that they are driven with a 180 degrees phase difference.

It is not an essential requirement of the present invention that a polarisation conversion element 218a, 218b has to be able (for example, typically it will not be able) to completely convert the polarisation for all wavelengths and all angles of the incident light involved. The polarisation conversion elements may be selected such that they provide a conversion of e.g. at least 85%, or at least 90% or at least 95%. The material type, the switching time, the switching frequency and the incident light angles may be selected in order to optimise the polarisation conversion.

For the polarisation beam splitters at the edge of the array, part of the light path need not be time-shared, i.e. the light path is either used or not but no different beams are using the same light path. Therefore, no controllable polarisation conversion elements that can be switch are required. Either a static polarisation converter or no conversion element, depending on the selected polarisation state, may be used. The light path is only used during by a single light source. Therefore, it is an open decision to the user whether this light is used. Using the light increases the amount of light but increases the geometrical extend of the polariser. This decision may be taken based on whether the system can efficiently use the extra light or not. Typically at part of the edge of the polariser, instead of a polarisation beam splitter, a reflecting element may be used as only light on the second light path B is reflected and no light following the first light path is present. Such a reflecting element may be based on a reflective coating or may be based on internal reflection like total internal reflection.

Similar to the controllable polarisation conversion elements 218a, 218b, the light sources 202a, 202b may be divided into two subsets. The first subset of light sources 202a, e.g. LEDs, generates first unpolarised beams cast on the input surfaces, or in other words input surface area 210. The first unpolarised beams will be received by a first subset of polarising beam splitters 212a that split up the first unpolarised beams in first polarised beams following light path A and second polarised beams following light path B. For light sources 202a of the first subset, light directed on light path A goes to the first subset of controllable polarisation conversion elements 218a. The second subset of light sources 202b, e.g. LEDs, generates second unpolarised beams cast on the input surfaces, or in other words input surface area 210. The second unpolarised beams will be received by a second subset of polarising beam splitters 212b that split up the second unpolarised beams in first polarised beams following light path A and second polarised beams following light path B. For light sources 202b of the second subset, light directed on light path A goes through the second subset of controllable polarisation conversion elements 218b that run in the opposite or inverted driving mode compared to the first subset of controllable polarisation conversion elements 218a. Although the polarising beam splitters 212a, 212b can be divided into two subsets, depending on the light sources 202a, 202b from which the unpolarised light beams are received, the operation of the polarising beam splitters 212a, 212 as such is not altered, in contrast to the controllable polarisation conversion elements and the light sources.

The driving sequences of the light sources 202a, 202b, e.g. LEDs, and the controllable polarisation conversion elements 218a, 218b are controlled by signals that synchronize the selection of ON/OFF mode of all the controllable polarisation conversion elements 218a, 218b and the selection of the ON or OFF state of the different light sources 202a, 202b. The controllable polarisation conversion elements 218a, 218b and the light sources 202a, 202b are controlled in such a way that during a first fraction of a selected time period, e.g. a first half of a selected time period, a first subset of light sources 202a are illuminating, i.e. are in the ON state, and only the first subset of controllable polarisation conversion elements 218a/218b are set to the ON mode, whereas the other subset of controllable polarisation conversion elements 218b/218a are put in the OFF mode. Which of the subsets of controllable conversion elements 218b/218a are put in the ON mode may be selected based on the type of polarisation state of the light that one finally wants to obtain. During another fraction of the selected time period, e.g. another different half of the selected time period, the light sources 202b that were previously OFF are turned ON and the other light sources 202a are turned back OFF again. The operational mode of the controllable polarisation conversion components is also inverted. In other words, the unpolarised light beams of the light sources 202a and the unpolarised light beams of the light sources 202b are alternately switched ON/OFF.

By way of illustration, operation of the polariser and/or the system for lighting as shown in FIG. 2 will be described in more detail. In FIG. 2, an array of light sources 202a, 202b divided in two subsets is shown whereby the light sources 202a, 202b are imaged on the input surface 210 using optical elements 206, 208. The array of light sources 202a, 202b may be, but typically is not, part of the polariser according to the embodiment of the present invention. In operation, light sources 202a of the first subset and light sources 202b of the second subset will be alternately pulsed. In other words, the unpolarised light beams from the light sources 202a and from the light sources 202b will be alternately switched ON. The polarising beam splitters 212a, 212b all operate in the same way, i.e. they transmit light having a first polarisation state along a first light path A and reflect light having a second polarisation state along a second light path B. The light sources 202a, 202b and the polarising beam splitters 212a, 212b are positioned such that light of a first light source 202a directed to a light path B time-shares at least part of the path with light of a neighbouring light source 202b directed on a light path A. The light sources 202a and the light sources 202b thus are positioned alternately in the array of light sources 202a, 202b. Light path A thus typically may be characterised at each moment as the light path for the light that is transmitted by the polarising beam splitter 212a, 212b whereas light path B may be characterised at each moment as the light path for the light that is reflected by the polarising beam splitter 212a, 212b.

As mentioned above, in operation, in a first fraction of the time period when light sources 202a are ON, light having a first polarisation state is transmitted by the polarising beam splitters 212a and guided on a first light path A. Light having a second polarisation state is reflected and guided on a second light path B. On the second light path B, the light having the second polarisation state is guided towards a neighbouring polarising beam splitter 212b, where it is further guided outside the polariser without changing the polarisation state. The controllable polarisation conversion elements 218b which are present in the second light path B, i.e. the second light path B for light from light sources 202a of the first subset of light sources, thus are controlled so as to not change the polarisation state. Light guided to the first light path A is altered from polarisation state switching from the first polarisation state to the second polarisation state. The latter is performed using the controllable polarisation conversion elements 218a, being in the light path A, i.e. in the light path A for light from the light sources 202a of the first subset 202a of light sources. In this way, all light leaving the polariser 200 has the same polarisation state.

In a second fraction of the time period, the light sources 202a are turned OFF and the light sources 202b are turned ON. Light having the first polarisation state is transmitted by the polarising beam splitter 212b and guided on the first light path A, while light having a second polarisation state is reflected and guided on a second light path B. Light in the second light path B is reflected by a neighbouring polarising beam splitter 212a and the light is further guided outside the polariser 200 without changing the polarisation state. Consequently, controllable polarisation conversion elements 218a which now are present in the second light path B, i.e. the second light path B for light from light sources 202b, are controlled not to change the polarisation state. Thus, whereas in the first fraction of the time period the controllable polarisation conversion elements 218a were active, in the second fraction of the time period the controllable polarisation conversion elements 218a are not active. After passing the polarising beam splitter 212b, light from light sources 202b on the first light path A is altered in polarisation state to light having the second polarisation state. The latter is done by using the controllable polarisation conversion elements 218b, which now are in the first light path A, i.e. the first light path A for light from light sources 202b. These controllable polarisation conversion elements 218b were not active during the first fraction of the time period but are active in the second fraction of the time period. In this way, substantially all light exiting the polariser 200 has the same polarisation state and this polarisation state is the same during the full time period of driving the light sources 202a, 202b.

It is to be noticed that although in FIG. 2 it is shown that light having the second polarisation state is coupled out, the latter may be altered by altering the active/passive driving of the controllable polarisation conversion elements 218a, 218b.

Figure 3:
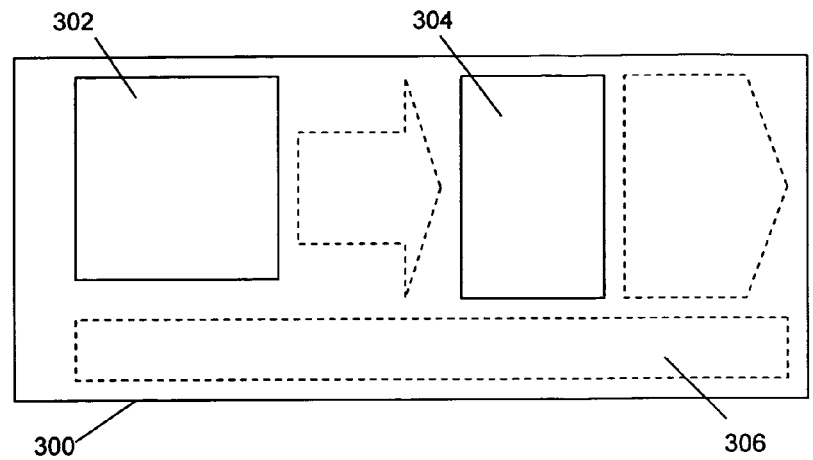
FIG. 3 shows a schematic representation of a system for lighting according to a second aspect of the present invention.

In a second aspect, the present invention relates to a lighting system for lighting such as a backlight or a general lighting device, wherein a beam of polarised light is generated. The lighting system is based on the polariser according to the first embodiment, but in the present embodiment an illumination part is part of the system. Such an illumination part typically comprises the light sources 202a, 202b as shown in FIG. 2 and optionally optical components such as 206 and 208 for imaging the light sources 202a, 202b on the entrance surface of the polariser 200. The light sources 202a, 202b typically are placed in array and adapted for operating the polariser 200 as described in the first aspect. Optionally the lighting system also may comprise a controller for controlling the pulsed driving of the light sources 202a, 202b. The same controller or a separate controller also may be present for controlling the controllable polarisation conversion elements 218a, 218b of the polariser. If separate controllers are used, typically communication between the controller for the light sources 202a, 202b and the controller for the controllable polarisation conversion elements 218a, 218b may be present to synchronise the driving signals in order to allow operation as described for the first embodiment. Driving circuitry for providing driving signals may be part of such a controller or may be separately provided in the system for lighting. FIG. 3 schematically illustrates the illumination part 302, the polariser 304 and the optional driver 306 of the lighting system 300. The system 300 furthermore may be part of a larger system such as a display or a projection system, further comprising typical components as well known by a person skilled in the art. The system 300 may act as a backlight in a display or as an illumination system in a projection system.

Figure 4:
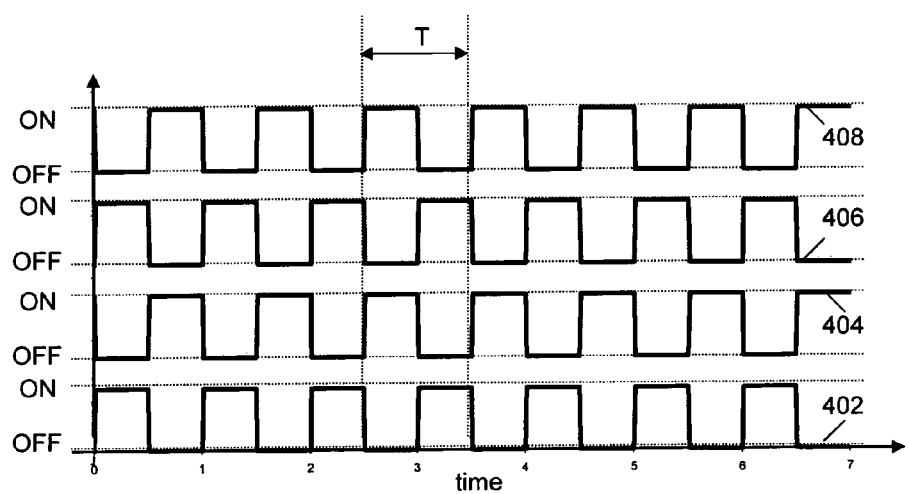
FIG. 4 shows an exemplary schematic representation of driving signals for driving light sources and polarisation conversion elements generated by a controller with driving circuitry according to embodiments of the present invention.

In a third aspect, the present invention relates to a controller for controlling the driving of the light sources 202a, 202b and for the driving of controllable polarisation conversion elements 218a, 218b as shown in FIG. 2. The controller is adapted for driving the light sources 202a, 202b and the controllable polarisation conversion elements 218a, 218b as described in the first embodiment of the present invention. An exemplary schematic driving scheme imposed by the controller for driving the different components is shown in FIG. 4, illustrating the different driving signals for the components as a function of time for different time periods T. Signal 402 shows the driving signal for light sources 202a of the first subset, signal 404 shows the driving signal for light sources 202b of the second subset, signal 406 shows the driving signal for controllable polarisation conversion elements 218a of a first subset and signal 408 shows the driving signal of the controllable conversion elements 218b of a second subset.

The controller may be implemented hardware-based or may be implemented software-based, e.g. implemented on a computing device. It may comprise the driving circuitry or it may co-operate with driving circuitry by controlling the driving circuitry to obtain appropriate driving of the light sources 202a, 202b and/or the controllable polarisation conversion elements 218a, 218b.

In a fourth aspect, the present invention relates to a method for creating a polarised light beam. The method preferably is used with a polariser or a system for lighting as described in any of the above embodiments. By way of illustration, reference will be made to components described in these embodiments, although the invention is not limited thereto and other components may be used. The method of the present invention typically comprises receiving first and second unpolarised beams and splitting the first and second unpolarised beams each into at least first polarised beams having a first polarisation state and second polarised beams having a second polarisation state differing from the first polarisation state. The latter can for example be done using an array of polarising beam splitters 212a, 212b. The first and second unpolarised beams typically may be alternately received. The method therefore may comprise, prior to receiving, creating first and second unpolarised beams, e.g. in an array of light sources 202a, 202b, in an alternating way. Creating of first and second unpolarised beams in an alternating way e.g. in an array of light sources 202a, 202b which can be driven in pulsed regime, may comprise, during a first fraction of a time period, generating light in a first subset of light sources 202a and not in a second subset of light sources 202b and during a second fraction of a time period, different from the first fraction, generating light in a second subset of light sources 202b and not in a first subset of light sources 202a. In other words, light sources 202a of a first subset and light sources 202b of a second subset may alternately be pulsed. The fractions of time periods each may correspond with half a period. The light sources 202a, 202b thereby may be typically arranged such that light of the first subset of light sources 202a may be guided on a first subset of polarising beam splitters 212a and light of a second subset of light sources 202b may be guided on a second set of polarising beam splitters 212b, the light sources 202a, 202b and polarising beam splitters 212a, 212b arranged alternately such that a polarising beam splitter 212a of the first subset is neighbouring a polarising beam splitter 212b of the second subset.

The method furthermore comprises guiding said first polarised beams on first light paths and second polarised beams on second light paths. The first light paths and the second light paths typically comprise controllable conversion elements 218a, 218b. The second polarised beams of the first unpolarised beams furthermore time-share light paths through said controllable conversion elements with first polarised beams of the second unpolarised beams.

The method also comprises switching polarisation conversion elements 218a, 218b to alternately convert the polarisation state or not convert the polarisation state of the impinging light in accordance with which of the first unpolarised beams or second unpolarised beams are received. The switching of polarisation conversion elements 218a, 218b may be switching ON a first subset of polarisation conversion elements 218a and switching OFF a second subset of polarisation conversion elements 218b during a first fraction of a time period, and inverting the operation during a second fraction of a time period. Switching said polarisation conversion elements may comprise controllably switching the polarisation conversion elements 218a, 218b in the ON/OFF state, whereby no polarisation conversion is performed in the OFF state and a polarisation conversion from the first to the second polarisation state and/or from the second to the first polarisation state is performed in the ON state. Switching the polarisation conversion elements 218a, 218b typically allows obtaining a light beam having substantially completely a predetermined polarisation state, both spatially and temporarily.

It is an advantage of embodiments of the present invention that a light beam with a substantially homogeneous average light intensity distribution may be obtained. The latter may be caused by the fact that different spatial parts of the output undergo similar filtering, altering or more general manipulating actions. It is especially advantageous for embodiments of the present invention that pulsed light sources can be used whereby the total flux of light generated over the active and non-active period of the light source exceeds half, preferably 60%, more preferably 70%, even more preferably 80%, still more preferably 90% of the total flux over the same time period in case of a continuous driving method.

Other arrangements for accomplishing the objectives of the polariser, lighting device or projection system embodying the invention will be obvious for those skilled in the art. It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A polariser comprising:
   first and second polarising beam splitters for splitting first and second unpolarised beams each into at least first and second polarised beams of different polarisation state,
   a first light path and a second light path, the second light path being different from the first light path and
   a first polarisation conversion element arranged after the first light path and a second polarisation conversion element arranged after the second light path, arranged such that said polarised beams from the first unpolarised beam time-share a same light path and the same polarisation conversion element with respective polarised beams from the second unpolarised beam, and the polarisation conversion elements being switchable to alternately convert the polarisation state or not convert the polarisation state of the polarised beams, depending on which beam is switched to pass through the polarisation conversion elements.

2. The polariser according to claim 1, wherein the polarisation conversion elements can be controlled to follow the switching of the beams, or wherein the switching of the beams can be controlled to follow the switching of the polarisation conversion elements.

3. A polariser according to claim 1, wherein the polariser comprises an array of polarising beam splitters and an array of polarisation conversion elements, each polarisation conversion element being arranged to receive beams from two or more neighbouring ones of the polarising beam splitters.

4. A polariser according to claim 1, wherein each polarising beam splitter is arranged in the path of an array of unpolarised beams simultaneously switched in pulsed regime.

5. A polariser according to claim 1, the polariser being adapted to handle a two dimensional array of unpolarised beams.

6. A system for lighting, the system for lighting comprising multiple light sources each generating an unpolarised beam, and a polariser according to claim 1.

7. A system for lighting according to claim 6, the system for lighting adapted for use in a projector or in a backlight.

8. A system for lighting according to claim 6, the system for lighting further comprising a light source controller, for modulating the light sources so that beams sharing the same polarisation conversion element are switched on alternately.

9. A system for lighting according to claim 6, the system for lighting comprising means for switching the beams by optical switches.

10. A system for lighting according to claim 6, wherein the light sources are light emitting devices or lasers.

11. A controller for controlling a system for lighting according to claim 6.

12. A method of controlling a display comprising a system for lighting according to claim 6, the method comprising modulating light sources and polarisation conversion elements synchronously.

13. A method for creating a polarised light beam, the method comprising the steps of:

receiving first and second unpolarised beams and splitting each of said first and second unpolarised beams into at least first polarised beams having a first polarisation state and second polarised beams having a second polarisation state differing from the first polarisation state, guiding said first polarised beams on first light paths and said second polarised beams on second light paths, the first light paths being different from the second light paths, the first light paths and second light paths each comprising controllable polarisation conversion elements and said polarised beams from the first unpolarised beam time-share a same light path and the same polarization conversion element with respective polarised beams from the second unpolarised beam through said controllable polarisation conversion elements; and switching said controllable polarisation conversion elements to alternately convert the polarisation state or not convert the polarisation state of the impinging polarised beam depending on which of the first or second polarised beams are received.

* * * * *